United States Patent
Noda et al.

(10) Patent No.: US 9,335,152 B2
(45) Date of Patent: May 10, 2016

(54) ROTATION ANGLE DETECTION DEVICE

(71) Applicant: Panasonic Corporation, Osaka (JP)

(72) Inventors: Hiromitsu Noda, Fukui (JP); Shozoh Shiraga, Fukui (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 624 days.

(21) Appl. No.: 13/705,292

(22) Filed: Dec. 5, 2012

(65) Prior Publication Data

US 2013/0147469 A1 Jun. 13, 2013

(30) Foreign Application Priority Data

Dec. 9, 2011 (JP) ................................. 2011-269703

(51) Int. Cl.
  *G01B 7/30* (2006.01)
  *B62D 15/02* (2006.01)
  *G01D 5/14* (2006.01)

(52) U.S. Cl.
  CPC *G01B 7/30* (2013.01); *B62D 15/02* (2013.01); *B62D 15/0215* (2013.01); *G01D 5/145* (2013.01)

(58) Field of Classification Search
  CPC ....... G01D 5/145; G01D 5/147; H02K 1/276; H02K 1/278; G01B 7/30; G01P 3/487; B62D 15/02; B62D 15/0215
  USPC .............................. 324/205–207.26, 260–261
  See application file for complete search history.

(56) References Cited

U.S. PATENT DOCUMENTS

| 3,108,221 | A  | * | 10/1963 | Peltoia | ........................ 73/519.01 |
| 6,208,054 | B1 | * | 3/2001 | Tajima | ................... H02K 29/03 |
| | | | | | 310/156.53 |
| 2002/0192089 | A1 | * | 12/2002 | Hill et al. | .................... 417/423.7 |
| 2005/0127907 | A1 | * | 6/2005 | Shiraga et al. | ............ 324/207.25 |
| 2006/0132126 | A1 | * | 6/2006 | Braun | .................. G01D 11/245 |
| | | | | | 324/260 |
| 2007/0194786 | A1 | * | 8/2007 | Hatanaka | ................ G01D 5/145 |
| | | | | | 324/207.25 |
| 2008/0297143 | A1 | * | 12/2008 | Tanaka | .................... B22F 5/106 |
| | | | | | 324/173 |
| 2010/0023219 | A1 | * | 1/2010 | Muller | ............... B62D 15/0215 |
| | | | | | 701/42 |
| 2010/0289484 | A1 | * | 11/2010 | Quinn | .................... G01D 5/145 |
| | | | | | 324/207.2 |

FOREIGN PATENT DOCUMENTS

JP 2009-236515 10/2009

* cited by examiner

*Primary Examiner* — Huy Q Phan
*Assistant Examiner* — Dustin Dickinson
(74) *Attorney, Agent, or Firm* — Panasonic Patent Center

(57) ABSTRACT

The present invention relates to a rotation angle detection device mainly used for rotation angle detection of a steering wheel of an automobile and the like.
In the rotation angle detection device of the present invention, support portions for supporting lower surfaces of magnets and retention portions for retaining upper surfaces of the magnets are provided in respective accommodation portions of first and second detection bodies. The magnets are turned in the accommodation portions, and the magnets are press-fitted into lower surfaces of the retention portions so as to be retained and fixed between the support portions and the retention portions. Thereby, an inexpensive rotation angle detection device in which the magnets can be easily and reliably installed in the detection bodies with a simple configuration without individually using holders can be realized.

10 Claims, 5 Drawing Sheets

ROTATION ANGLE DETECTION DEVICE

This application claims priority to Japanese Patent Application No. 2011-269703 filed on Dec. 9, 2011. The disclosures of these applications including the specifications, the drawings, and the claims are hereby incorporated by reference in its entirety.

BACKGROUND

1. Technical Field

The present invention relates to a rotation angle detection device mainly used for rotation angle detection of a steering wheel of an automobile and the like.

2. Description of the Related Art

In recent years, while functions of an automobile is advanced, automobiles in which a rotation angle of a steering wheel is detected by a rotation angle detection device and various controls of a vehicle are performed with the rotation angle are increasing.

Such a conventional rotation angle detection device will be described with reference to FIG. 5.

FIG. 5 is an exploded perspective view of the conventional rotation angle detection device. In FIG. 5, a reference sign 1 denotes a synthetic resin rotation body in which spur gear portion 1A is formed on an outer periphery of a side surface. A pair of engagement portions 1B to be engaged with a shaft of a steering (not shown) to be inserted is formed on an inner periphery of a center cylinder part of rotation body 1.

A reference sign 2 denotes a synthetic resin first detection body in which spur gear portion 2A is formed on an outer periphery of a side surface. A reference sign 3 denotes a synthetic resin second detection body in which spur gear portion 3A having the different number of gear teeth from spur gear portion 2A is formed on an outer periphery of a side surface. Spur gear portion 2A of first detection body 2 is meshed with spur gear portion 1A of rotation body 1, and spur gear portion 3A of second detection body 3 is meshed with spur gear portion 2A of first detection body 2.

Concave and substantially-rectangular accommodation portion 2B is formed in a center of first detection body 2, and concave and substantially-rectangular accommodation portion 3B is similarly formed in a center of second detection body 3. Cuboid magnets 4A, 5A are respectively accommodated in accommodation portions 2B, 3B.

Further, a reference sign 6 denotes a synthetic resin holder. Biasing portion 6A extends downward from a one side end of a top surface of holder 6. Grip portions 6B are formed so as to extend downward from both sides of holder 6. Magnets 4A, 5A are respectively installed so as to be retained and fixed in accommodation portions 2B, 3B by holders 6.

A reference sign 7 denotes a wiring substrate arranged on the upper side of first and second detection bodies 2, 3 substantially in parallel. A plurality of wiring patterns (not shown) is formed on upper and lower surfaces of wiring substrate 7. Magnetism detection elements 4B and 5B are respectively installed on a surface of wiring substrate 7 facing magnet 4A installed in the center of first detection body 2 and magnet 5A installed in the center of second detection body 3.

First detection means is formed by magnet 4A and magnetism detection element 4B facing each other in such a way, and second detection means is similarly formed by magnet 5A and magnetism detection element 5B. Further, control means 8 connected to magnetism detection elements 4B and 5B is formed by an electronic part such as a microcomputer in wiring substrate 7, so that the rotation angle detection device is formed.

The rotation angle detection device formed in such a way is installed in an automobile by connecting control means 8 to an electronic circuit (not shown) of a vehicle via a connector, a lead (not shown), and the like and inserting the shaft of the steering into engagement portions 1B of rotation body 1.

With the above configuration, when a steering wheel is rotated, rotation body 1 locked onto the steering shaft is rotated, first detection body 2 is rotated in conjunction with the rotation body 1, and then second detection body 3 is rotated in conjunction with first detection body 2. Thereby, magnets 4A, 5A respectively installed in the centers of first detection body 2 and second detection body 3 are also rotated, and magnetism detection elements 4B, 5B detect changing magnetic forces of magnets 4A, 5A as detection signals. First detection body 2 and second detection body 3 have the difference number of gear teeth and different rotation speed from each other. Thus, data waveforms of magnetism detection elements 4B and 5B become the detection signals in which a cycle is different and a phase is shifted.

Based on the two different detection signals from first detection body 2 and second detection body 3 and the numbers of gear teeth, control means 8 performs predetermined calculation so as to detect a rotation angle of rotation body 1, that is, of the steering wheel. The detected rotation angle is outputted to the electronic circuit of the automobile and various controls of the vehicle are performed.

It should be noted that for example, Unexamined Japanese Patent Publication No. 2009-236515 is known as the related art of the invention of the present application.

SUMMARY

In the conventional rotation angle detection device, after magnets 4A, 5A are accommodated in accommodation portions 2B, 3B of first and second detection bodies 2, 3, holders 6 are placed from the upper side of magnets 4A, 5A accommodated in accommodation portions 2B, 3B, so that the magnets are respectively installed so as to be retained and fixed in accommodation portions 2B, 3B. Therefore, holders 6 are respectively individually required, and retention and fixing by holders 6 take time and efforts. Thus, there is a problem that manufacturing cost is easily increased.

The present invention is to solve the above conventional problem, and an object thereof is to provide an inexpensive rotation angle detection device in which magnets can be easily and reliably installed in detection bodies with a simple configuration.

In order to achieve the above object, the rotation angle detection device of the present invention has a rotation body rotated in conjunction with a steering, and a first detection body rotated in conjunction with the rotation body. The rotation angle detection device of the present invention has a cuboid first magnet installed in a first accommodation portion which is provided in a center of the first detection body, and a first magnetism detection element arranged so as to face the first magnet. The rotation angle detection device of the present invention has control means for detecting a rotation angle of the rotation body by a detection signal from the first magnetism detection element. The first accommodation portion has a first support portion for supporting one surface of the first magnet, and a first retention portion for retaining the other surface facing the one surface.

According to the present invention, the support portion for supporting the one surface of the magnet and the retention portion for retaining the other surface facing the one surface are provided in the accommodation portion of the detection body, and the magnet is turned in the accommodation portion and press-fitted between the support portion and the retention portion. Since the magnet is retained and fixed in the accommodation portion, only by turning the magnet relative to the support portion and the retention portion integrally formed in the accommodation portion, the magnet is press-fitted between these portions so as to be retained and fixed. Therefore, there is an effect of obtaining an inexpensive rotation angle detection device in which the magnet can be easily and reliably installed in the detection body with a simple configuration without individually using holders.

DETAILED DESCRIPTION OF THE PREFERRED EMBODIMENT

Hereinafter, an embodiment of the present invention will be described with reference to FIGS. 1 to 4C.

Figure 1:
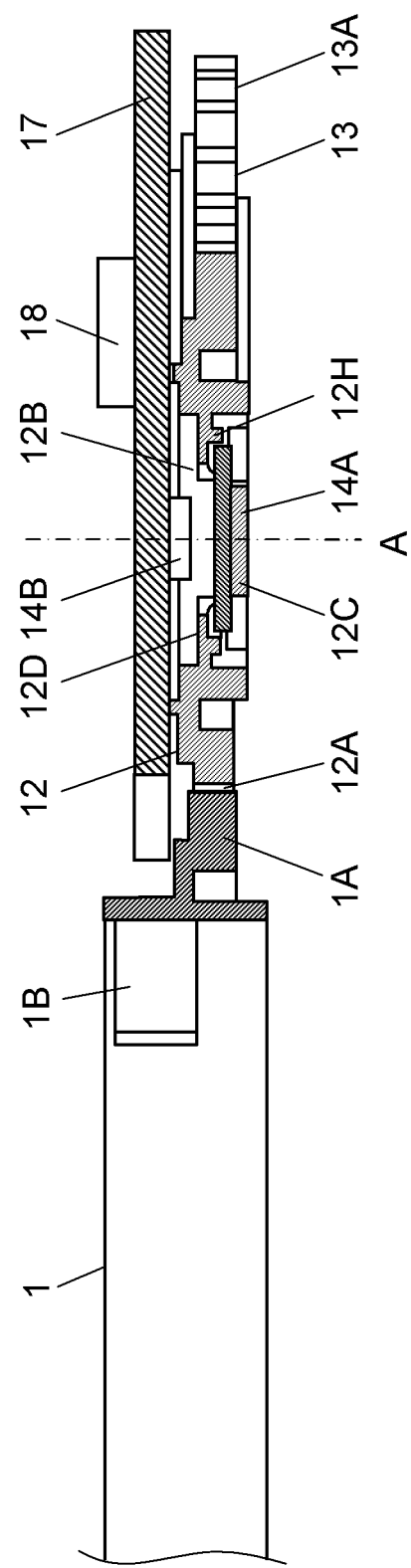
FIG. 1 is a sectional view of a rotation angle detection device according to one embodiment of the present invention.
Figure 2:
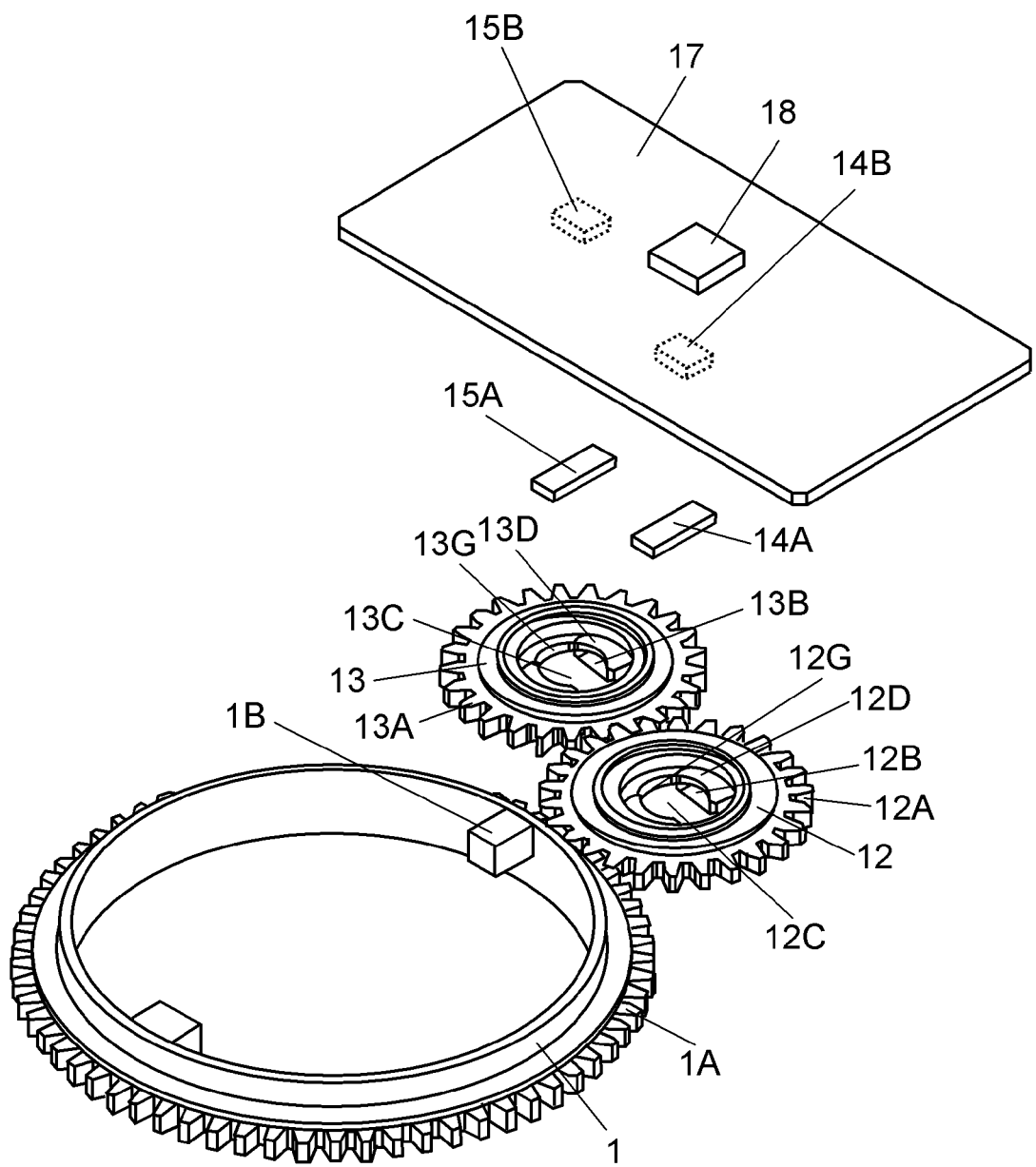
FIG. 2 is an exploded perspective view of the rotation angle detection device according to the one embodiment of the present invention.

FIG. 1 is a sectional view of a rotation angle detection device according to one embodiment of the present invention, and FIG. 2 is an exploded perspective view thereof. In FIGS. 1 and 2, a reference sign 1 denotes a synthetic resin or metal rotation body in which spur gear portion 1A is formed on an outer periphery of a side surface, and a pair of engagement portions 1B to be engaged with a shaft of a steering (not shown) to be inserted is formed on an inner periphery of a center cylinder part.

A reference sign 12 denotes a synthetic resin (e.g., polyoxymethylene) first detection body in which spur gear portion 12A is formed on an outer periphery of a side surface. A reference sign 13 denotes a synthetic resin (e.g., polyoxymethylene) second detection body in which spur gear portion 13A having the different number of gear teeth from spur gear portion 12A is formed on an outer periphery of a side surface. Spur gear portion 12A of first detection body 12 is meshed with spur gear portion 1A of rotation body 1, and spur gear portion 13A of second detection body 13 is meshed with spur gear portion 12A of first detection body 12.

Substantially-circular and downward-recessed accommodation portions 12B, 13B are provided on upper surfaces of first and second detection bodies 12, 13, and substantially long plate shape support portions 12C, 13C in which openings are formed on both sides are formed on bottom surfaces.

Further, inward-protruding retention portions 12D, 13D whose front ends are cut out into a substantially arc shape are respectively provided on inner peripheries of accommodation portions 12B, 13B on the upper side of the support portions 12C, 13C. Retention portions 12D, 13D are respectively provided at two points so as to face each other symmetrically with respect to rotation axes A of first and second detection bodies 12, 13.

Figure 3:
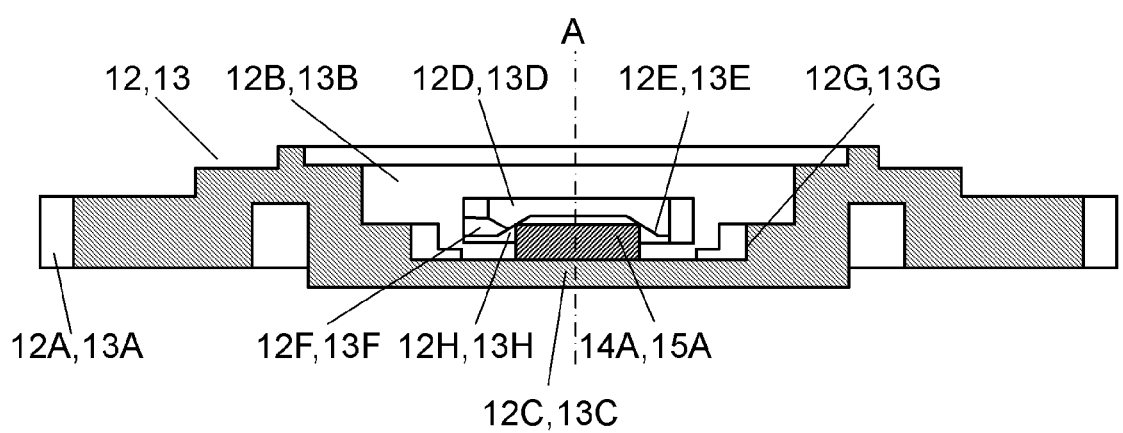
FIG. 3 is an enlarged sectional view of substantial parts of the rotation angle detection device according to the one embodiment of the present invention.

As shown in an enlarged sectional view of substantial parts of FIG. 3, inner inclination portions 12E, 13E spaced from each other so as to have a predetermined gap, the inner inclination portions going down to the outer side are respectively provided in the vicinity of both ends on lower surfaces of retention portions 12D, 13D of first and second detection bodies 12, 13. Outer inclination portions 12F, 13F going down from the outer side to the inner side are provided in one ends such as the vicinity of front ends of left ends on the lower surfaces of retention portions 12D, 13D of first and second detection bodies 12, 13. Upper surfaces of support portions 12C, 13C and the lower surfaces of retention portions 12D, 13D are arranged so as to have a predetermined gap.

In the vicinity of longitudinal ends of support portions 12C, 13C, a pair of lower support wall portions 12G and a pair of lower support wall portions 13G are respectively formed so as to face each other in a substantially arc shape having a predetermined radius from the rotation axes A of first and second detection bodies 12, 13.

Further, on the lower surfaces of retention portions 12D, 13D, a pair of upper support wall portions 12H and a pair of upper support wall portions 13H are respectively formed so as to face each other in a substantially arc shape protruding downward and having a predetermined radius from the rotation axes A of first and second detection bodies 12, 13.

It should be noted that diameters of facing lower support wall portions 12G and 13G and upper support wall portions 12H and 13H are slightly larger than length of diagonal lines of upper and lower surfaces of substantially cuboid magnets 14A and 15A to be described later.

Magnets 14A, 15A are formed in a substantially cuboid and the lower surfaces of magnets 14A, 15A are supported by the upper surfaces of support portions 12C, 13C in such a manner that the longitudinal directions cross each other. Both lateral ends of longitudinal ends of the upper surfaces of magnets 14A, 15A are pressed onto inner inclination portions 12E, 13E in the vicinity of both the ends of the lower surfaces of retention portions 12D, 13D and retained and fixed so as not to be easily rotated.

Both the longitudinal ends of magnets 14A, 15A are supported by upper support wall portions 12H, 13H on the lower surfaces of retention portions 12D, 13D so as not to be displaced in the longitudinal direction.

With reference to plan views of substantial parts of FIGS. 4A to 4C, a method of installing magnets 14A, 15A to first and second detection bodies 12, 13 will be described.

It should be noted that since the same method of installing is applied to both first detection body 12 and magnet 14A and second detection body 13 and magnet 15A, the method of installing first detection body 12 and magnet 14A will be representatively described as an example.

Figure 4A:
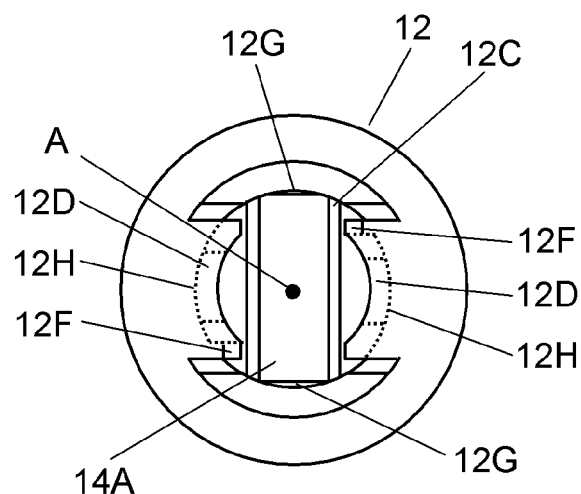
FIG. 4A is a plan view of substantial parts for illustrating installment of a magnet in the rotation angle detection device according to the one embodiment of the present invention.

Firstly, as shown in FIG. 4A, magnet 14A is disposed on support portion 12C on the inner side of lower support wall portions 12G between facing retention portions 12D of first detection body 12.

Figure 4B:
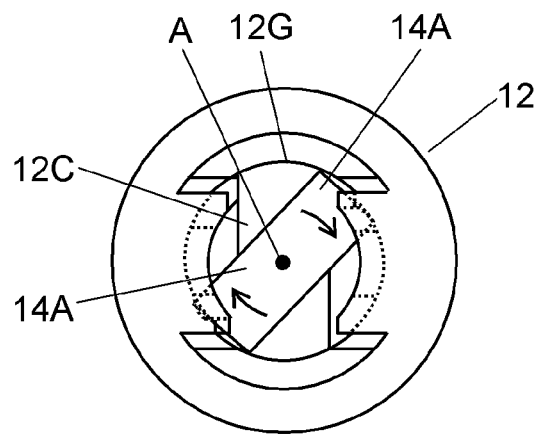
FIG. 4B is a plan view of substantial parts for illustrating the installment of the magnet in the rotation angle detection device according to the one embodiment of the present invention.

Next, as shown in FIG. 4B, magnet 14A is turned for example clockwise along inner peripheries of lower support wall portions 12G. Ends of magnet 14A are invited and turned by outer inclination portions 12F respectively provided on the rear lower surface of right retention portion 12D and on the front lower surface of left retention portion 12D. At this time, retention portions 12D are elastically deformed upward, so that the ends of magnet 14A are turned clockwise while in elastic contact with the lower surfaces of retention portions 12D.

Figure 4C:
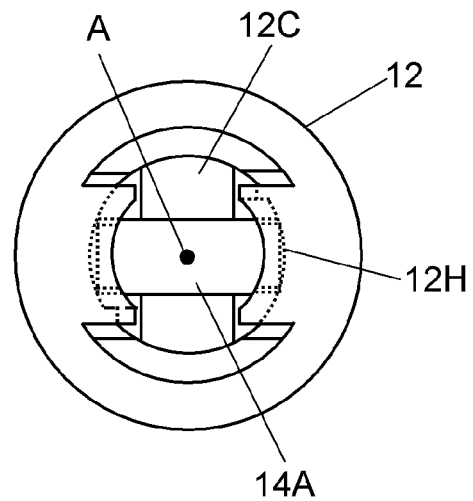
FIG. 4C is a plan view of substantial parts for illustrating the installment of the magnet in the rotation angle detection device according to the one embodiment of the present invention.
Figure 5:
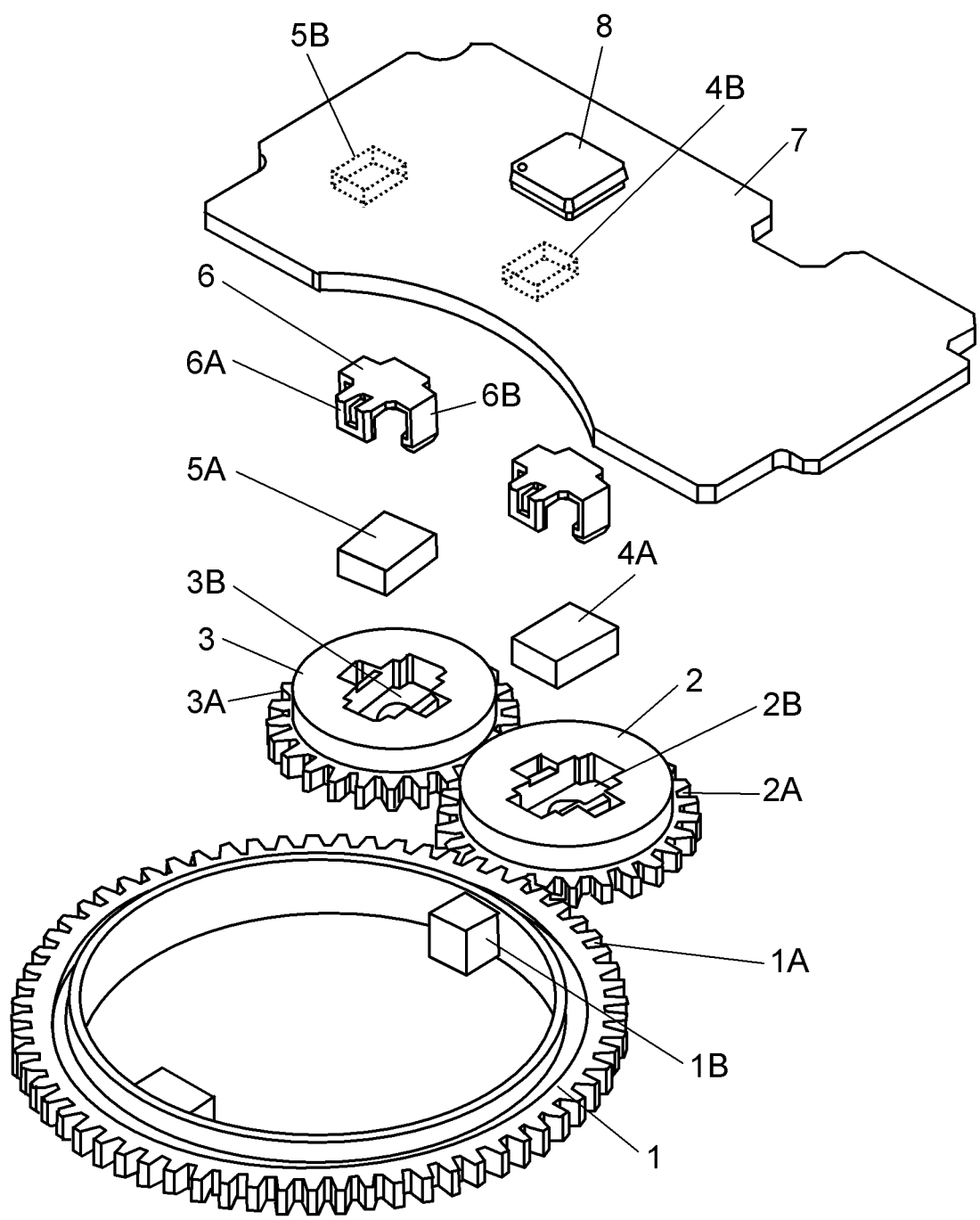
FIG. 5 is an exploded perspective view of a conventional rotation angle detection device.

Further, when magnet 14A is turned clockwise and rotated by about 90 degrees from the position of FIG. 4A, the longitudinal direction of magnet 14A is substantially orthogonal to support portion 12C as shown in FIGS. 3 and 4C. Both the lateral ends of both the longitudinal ends of the upper surface of magnet 14A are pressed onto inner inclination portions 12E of retention portions 12D and retained and fixed in a state that magnet 14A is press-fitted between support portion 12C and both facing retention portions 12D.

It should be noted that at this time, magnet 14A is supported by upper support wall portions 12H in the longitudinal direction, reliably retained and fixed by facing retention portions 12D in the rotation direction, and installed in a state that a center of magnet 14A and the rotation axis A of first detection body 12 substantially match with each other.

That is, by disposing magnet 14A on support portion 12C from the upper side of first detection body 12 and turning the magnet in the predetermined direction, the lower surface of magnet 14A is supported by support portion 12C. Further, both the ends of the upper surface of magnet 14A are press-fitted into facing retention portions 12D and center mismatch of magnet 14A and first detection body 12 is not easily generated, so that the magnet is reliably retained and fixed. Thereby, there is no need for installing the magnet in the detection body with using holders or the like as described in the related art, so that the magnet can be easily and reliably installed in the detection body with a simple configuration.

As shown in FIG. 2, a reference sign 17 denotes a phenolic paper, glass epoxy, or other wiring substrate arranged on the upper side of first and second detection bodies 12, 13 in substantially parallel. A plurality of wiring patterns (not shown) is formed on upper and lower surfaces of wiring substrate 17. Magnetism detection elements 14B and 15B are respectively mounted on a surface of wiring substrate 17 facing magnet 14A installed in a center of first detection body 12 and magnet 15A installed in a center of second detection body 13.

First detection means is formed by magnet 14A and magnetism detection element 14B facing each other in such a way, and second detection means is similarly formed by magnet 15A and magnetism detection element 15B. Further, control means 18 connected to magnetism detection elements 14B and 15B is formed by an electronic part such as a microcomputer in wiring substrate 17, so that the rotation angle detection device is formed.

The rotation angle detection device formed in such a way is installed in an automobile by connecting control means 18 to an electronic circuit (not shown) of a vehicle via a connector, a lead (not shown), and the like and inserting the shaft of the steering into engagement portions 1B of rotation body 1.

With the above configuration, when a steering wheel is rotated, rotation body 1 locked onto the steering shaft is rotated, first detection body 12 is rotated in conjunction with the rotation body 1, and then second detection body 13 is rotated in conjunction with first detection body 12. Thereby, magnets 14A, 15A respectively installed in the centers of first detection body 12 and second detection body 13 are also rotated.

Magnetism detection elements 14B, 15B detect changing magnetic forces of magnets 14A, 15A as detection signals. First detection body 12 and second detection body 13 have the difference number of gear teeth and different rotation speed from each other. Thus, data waveforms of magnetism detection elements 14B and 15B become the detection signals in which a cycle is different and a phase is shifted.

Based on the two different detection signals from first detection body 12 and second detection body 13 and the numbers of gear teeth, control means 18 performs predetermined calculation so as to detect a rotation angle of rotation body 1, that is, of the steering wheel. The detected rotation angle is outputted to the electronic circuit of the automobile and various controls of the vehicle are performed.

In such a way, according to the present embodiment, support portions 12C, 13C for supporting the lower surfaces of magnets 14A, 15A and retention portions 12D, 13D for retaining the upper surfaces are provided in accommodation portions 12B, 13B of first and second detection bodies 12, 13. By turning magnets 14A, 15A in accommodation portions 12B, 13B, magnets 14A, 15A are press-fitted into the lower surfaces of retention portions 12D, 13D, and retained and fixed between support portions 12C, 13C and retention portions 12D, 13D. Thereby, magnets 14A, 15A are turned relative to support portions 12C, 13C and retention portions 12D, 13D integrally formed in accommodation portions 12B, 13B so as to be retained and fixed. Therefore, an inexpensive rotation angle detection device in which the magnets can be easily and reliably installed in the detection bodies with a simple configuration without individually using holders can be realized.

It should be noted that in the above description, retention portions 12D, 13D are integrally formed on the upper side and support portions 12C, 13C are integrally formed on the lower side in accommodation portions 12B, 13B. However, even when the support portions are integrally formed on the upper side and the retention portions are integrally formed on the lower side in accommodation portions 12B, 13B, and the magnets are arranged between the retention portions from the lower side of the detection bodies and turned so as to be retained and fixed between the support portions and the retention portions, the present invention can be implemented.

In the above description, magnets 14A, 15A are respectively installed in first detection body 12 rotated in conjunction with rotation body 1 and second detection body 13 rotated in conjunction with first detection body 12. In the above description, control means 18 detects the rotation angle of rotation body 1 based on the detection signals from magnetism detection elements 14B, 15B facing magnets 14A, 15A. However, first detection body 12 and second detection body 13 may be respectively meshed with rotation body 1 so as to be rotated in conjunction with the rotation body 1, and as well as the above description, the control means may detect the rotation angle of rotation body 1 from rotation of first and second detection bodies 12, 13.

Further, only first detection body 12 rotated in conjunction with rotation body 1 and the first detection means including magnet 14A installed in the first detection body and magnetism detection element 14B may be provided. In addition to the control means, storage means may be provided for detecting the rotation angle of rotation body 1. In variously formed rotation angle detection devices, the present invention can be implemented.

The present invention has an advantageous effect of obtaining an inexpensive rotation angle detection device in which the magnets can be easily and reliably installed in the detection bodies with a simple configuration without individually using holders. The rotation angle detection device of the present invention is useful mainly for detecting a rotation angle of a steering wheel of an automobile.

What is claimed is:

1. A rotation angle detection device, comprising:
   a rotation body rotated in conjunction with a steering;
   a first detection body rotated in conjunction with the rotation body;
   a cuboid first magnet installed in a first accommodation portion which is provided in a center of the first detection body;
   a first magnetism detection element arranged so as to face the first magnet; and
   control means for detecting a rotation angle of the rotation body by a detection signal from the first magnetism detection element, wherein
   the first accommodation portion includes a first support portion for supporting a first surface of the first magnet, and
   a pair of first retention portions for retaining a second surface opposite to the first surface of the first magnet, each of the pair of first retention portions protruding inward at an inner periphery of the first accommodation portion,
   wherein the each of the first retention portions has a downward first inner inclination portion, and a substantially arc shape upper support wall portion having a predetermined radius from a rotation axis of the first detection body, on a lower surface of the first retention portion,
   the second surface of the first magnet is retained by pressing both lateral ends of longitudinal ends of the second surface of the first magnet onto the first inner inclination portions, and
   the first magnet is installed in the first accommodation portion by supporting both the longitudinal ends of the first magnet using the upper support wall portions.

2. The rotation angle detection device according to claim 1, wherein the first magnet is turned in the first accommodation portion and press-fitted between the first support portion and the first retention portion.

3. The rotation angle detection device according to claim 1, wherein the first detection body is made of synthetic resin.

4. The rotation angle detection device according to claim 3, wherein the synthetic resin includes polyoxymethylene.

5. The rotation angle detection device according to claim 1, further comprising:
   a second detection body rotated in conjunction with the first detection body or the rotation body; a cuboid second magnet installed in a second accommodation portion which is provided in a center of the second detection body; and
   a second magnetism detection element arranged so as to face the second magnet, wherein
   the control means detects the rotation angle of the rotation body by detection signals from the first magnetism detection element and the second magnetism detection element.

6. The rotation angle detection device according to claim 5, wherein a first numbers of gear teeth of the first detection body is different from a second numbers of gear teeth of the second detection body.

7. The rotation angle detection device according to claim 5, wherein the second accommodation portion includes a second support portion for supporting a first surface of the second magnet, and a pair of second retention portions for retaining a second surface opposite to the first surface of the second magnet, each of the pair of second retention portions protruding inward at an inner periphery of the second accommodation portion,
   wherein the each of the second retention portions has a downward second inner inclination portion, and a substantially arc shape upper support wall portion having a predetermined radius from a rotation axis of the second detection body, on a lower surface of the second retention portion, and
   the second surface of the second magnet is retained by pressing both lateral ends of longitudinal ends of the second surface of the second magnet onto the second inner inclination portions, and
   the second magnet is installed in the second accommodation portion by supporting both the longitudinal ends of the second magnet using the upper support wall portions.

8. The rotation angle detection device according to claim 7, wherein the second magnet is turned in the second accommodation portion and press-fitted between the second support portion and the second retention portion.

9. The rotation angle detection device according to claim 5, wherein the second detection body is made of synthetic resin.

10. The rotation angle detection device according to claim 9, wherein the synthetic resin includes polyoxymethylene.

* * * * *